(No Model.)
S. H. COOMBS.
BATTER MIXER, &c.
No. 573,208. Patented Dec. 15, 1896.
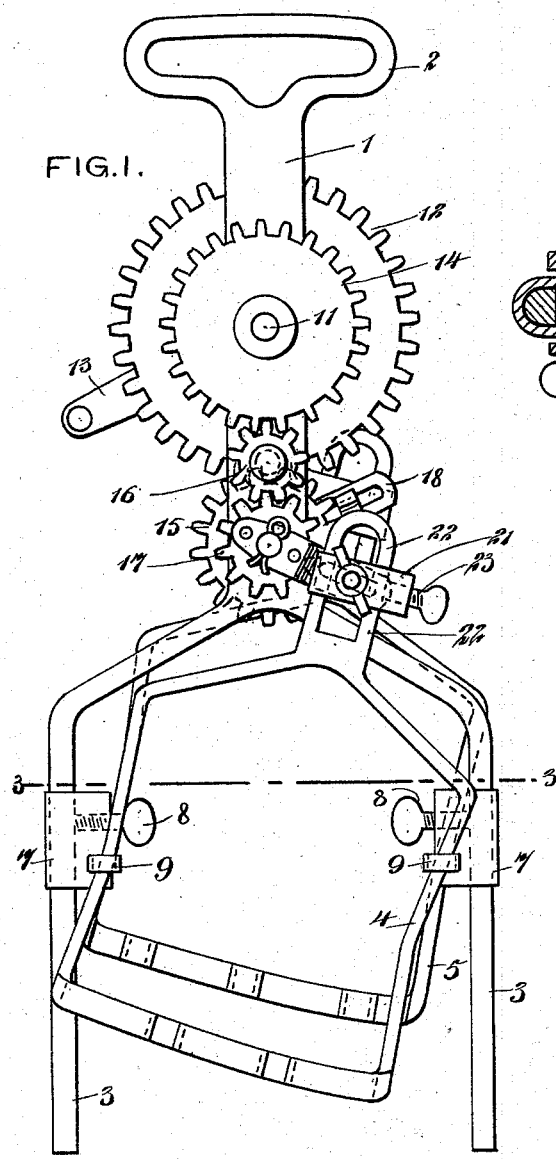
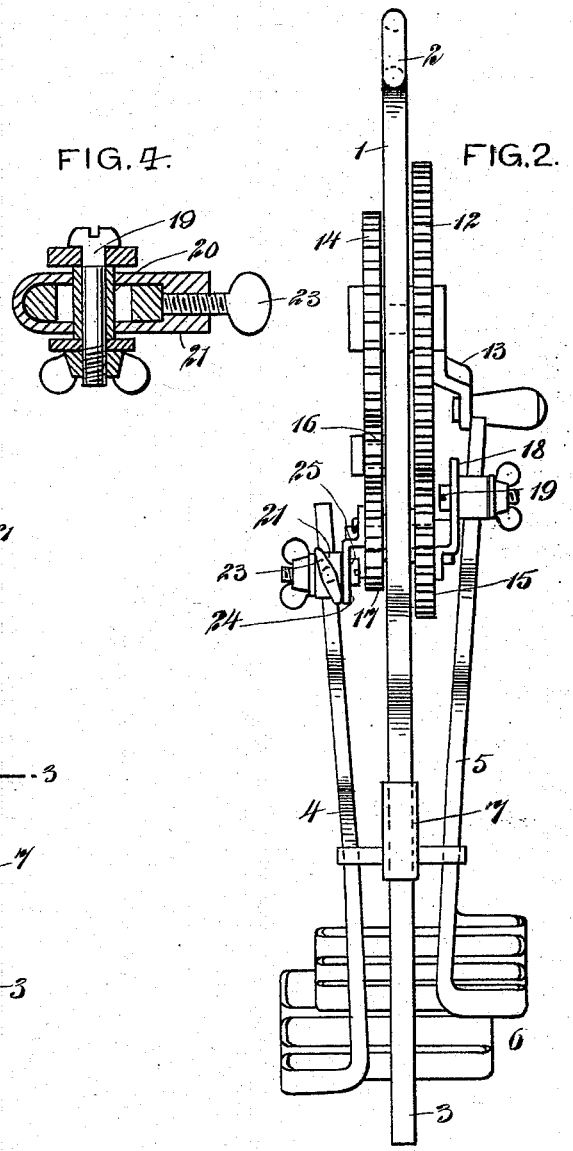
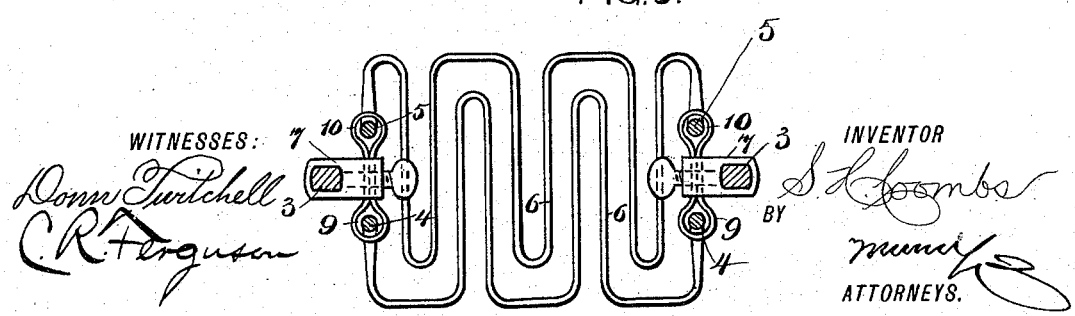
WITNESSES:
Donn Turtchell
C. R. Ferguson
INVENTOR
S. H. Coombs
BY
ATTORNEYS.

UNITED STATES PATENT OFFICE.

STEPHEN H. COOMBS, OF HELENA, MONTANA.

BATTER-MIXER, &c.

SPECIFICATION forming part of Letters Patent No. 573,208, dated December 15, 1896.

Application filed July 27, 1896. Serial No. 600,691. (No model.)

*To all whom it may concern:*

Be it known that I, STEPHEN H. COOMBS, of Helena, in the county of Lewis and Clarke and State of Montana, have invented new and useful Improvements in Batter-Beaters, of which the following is a full, clear, and exact description.

This invention relates to devices for beating and stirring batter for cakes, whipping cream, beating eggs, &c.; and the object is to provide a device for this purpose so constructed that the beaters will operate rapidly in opposite directions with both a vertical and lateral throw, thus thoroughly and quickly beating and stirring the material operated upon.

I will describe a beater embodying my invention and then point out the novel features in the appended claims.

Reference is to be had to the accompanying drawings, forming a part of this specification, in which similar characters of reference indicate corresponding parts in all the views.

Figure 1 is a side elevation of a device embodying my invention. Fig. 2 is an edge elevation thereof. Fig. 3 is a section substantially on the line 3 3 of Fig. 1, and Fig. 4 is a sectional detail drawn on an enlarged scale.

The frame of the beater comprises a shank portion 1, having a handpiece 2 at its upper end and having at its opposite ends downwardly-extending parallel legs 3. Beaters 4 and 5 are mounted to move both vertically and laterally with relation to the legs 3 and in opposite directions one beater relatively to the other. Each beater comprises side members and a foot portion bent to form fingers 6, the fingers of one beater alternating with those of the other.

Adjustable longitudinally on the legs 3 are guide-blocks 7, held as adjusted by means of set-screws 8. Extended outward from one side of each guide-block 7 is a guide-eye 9, through which the side members of the beater 4 loosely move, and extended from the opposite side of the guide-blocks are similar eyes 10, through which the side members of the beater 5 loosely move.

I will now describe the means for imparting the vertical and lateral movements to the said beaters in opposite directions. Extended through the shank portion 1 of the frame is a shaft 11, upon one end of which is secured a gear-wheel 12, having a crank-handle 13, and on the opposite end of said shaft 11, or at the side of the frame opposite that upon which the gear-wheel 12 is placed, is a gear-wheel 14, of somewhat smaller diameter than the wheel 12. The wheel 12 meshes with a pinion 15, mounted to rotate on a stud fixed to the frame, and the gear-wheel 14 meshes with a pinion 16, which in turn meshes with a pinion 17, both of said pinions being mounted on studs secured to the frame. As the pinion 17 is smaller than the pinion 15 and the gear 11 is smaller than the gear 12, it is obvious that the beaters operated by these gears will have a practically uniform or equal speed.

Affixed to the pinion 15 is a crank-arm 18, provided with a longitudinal slot through which a wrist-pin 19 extends. This wrist-pin 19 is carried by the upper end or stem portion of the beater 4. As here shown, the wrist-pin consists of a threaded bolt extended through a sleeve 20, mounted in a wrist-pin block 21, adjustable longitudinally on the stem portion 22 of the beater 4. This stem portion 22 of the beater is longitudinally slotted and the sleeve 20 extends through said slot, the block 21 being also slotted to engage around the outer surface of the stem 22. The block may be held as adjusted on the stem by means of a set-screw 23.

Attached to the pinion 17 is a slotted crank-arm 24, engaging with a wrist-pin 25, supported by a wrist-pin block 21, similar to the wrist-pin block first described, and adjustable longitudinally of the slotted shank portion of the beater 5. By means of these vertical adjustments it is obvious that the beaters may be arranged for a greater or less amount of throw, as the character of the material operated upon may require. During the movements of the parts the wrist-pins may have a sliding movement in their slotted crank-arms. Therefore no binding of the parts will occur.

In operation the beaters are placed in the material to be operated upon, with the legs 3 resting on the bottom of the vessel containing the same. Then by rotating the gearing the said beaters will be caused to move both vertically and in a lateral direction, one moving upward while the other is moving downward.

It is obvious that a device embodying my invention will be particularly useful in restaurants, hotels, or in bakeries, where large amounts of batter or similar material are operated upon, but of course the device is equally useful for household purposes. The several parts may be made of suitable metal and may be galvanized or otherwise coated, so as not to endanger the material operated upon through rust that might gather on metal not coated or plated.

Having thus described my invention, I claim as new and desire to secure by Letters Patent—

1. A beater, comprising a frame having legs, guides mounted on said legs, beaters having side members movable through the guides, and means for imparting vertical and lateral movements to the beaters, one in an opposite direction to the other, substantially as specified.

2. A beater, comprising a frame having parallel legs, guide-blocks adjustably mounted on said legs, guide-eyes extended outward from said guide-blocks, beaters having side members movable through said guide-eyes, and gearing for imparting a vertical and lateral movement to said beaters, one in an opposite direction to the other, substantially as specified.

3. A beater, comprising a frame having legs and a stem portion, guides on the legs of the frame, beaters having their side members movable through said guides, a crank-pin adjustably mounted on each beater, and gearing comprising crank-arms engaging with said wrist-pins, substantially as specified.

4. A beater, comprising a frame having parallel legs and a stem portion, guides adjustably mounted on the legs, beaters having their side members extended loosely through said guides, each beater having a slotted stem portion, a wrist-pin block adjustably mounted on each stem portion, a wrist-pin carried by said block, and a chain of gearing for operating the beaters, comprising pinions having slotted crank-arms engaging with the wrist-pins, substantially as specified.

STEPHEN H. COOMBS.

Witnesses:
GUS EHRENBERG,
JNO. W. EDDY.